United States Patent
Ansari et al.

(10) Patent No.: US 12,237,500 B2
(45) Date of Patent: Feb. 25, 2025

(54) USE OF PERFORATED ELECTRODES IN SILICON-DOMINANT ANODE CELLS

(71) Applicant: Enevate Corporation, Irvine, CA (US)

(72) Inventors: Younes Ansari, Irvine, CA (US); Ambica Nair, Irvine, CA (US); Benjamin Park, Mission Viejo, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 16/903,900

(22) Filed: Jun. 17, 2020

(65) Prior Publication Data

US 2021/0143400 A1 May 13, 2021

Related U.S. Application Data

(62) Division of application No. 16/676,813, filed on Nov. 7, 2019.

(51) Int. Cl.
*H01M 4/36* (2006.01)
*H01M 4/134* (2010.01)
(Continued)

(52) U.S. Cl.
CPC .......... *H01M 4/366* (2013.01); *H01M 4/134* (2013.01); *H01M 4/386* (2013.01); *H01M 4/742* (2013.01);
(Continued)

(58) Field of Classification Search
CPC ...... H01M 4/134; H01M 4/742; H01M 4/366; H01M 4/386; H01M 10/0585; H01M 10/0525
See application file for complete search history.

(56) References Cited

U.S. PATENT DOCUMENTS

2011/0111294 A1 5/2011 Lopez
2013/0043843 A1* 2/2013 Amiruddin ......... H01M 4/0447
429/231.95
(Continued)

FOREIGN PATENT DOCUMENTS

CN 112599723 A * 4/2021 ........ H01M 10/0525
CN 112909219 A * 6/2021 ........ H01M 10/0525

OTHER PUBLICATIONS

Notification of Transmittal of the International Search Report and the Written Opinion of the International Searching Authority, or the Declaration for International Application No. PCT/US20/58057, International Filing Date Oct. 29, 2020, Date of Mailing Jan. 26, 2021.
(Continued)

*Primary Examiner* — Amanda C. Walke
(74) *Attorney, Agent, or Firm* — McAndrews, Held & Malloy, Ltd.

(57) ABSTRACT

Systems and methods for use of perforated anodes in silicon-dominant anode cells may include a cathode, an electrolyte, and an anode, where the cathode and anode each comprise an active material on a current collector. Both of the current collector and active material may be perforated. For example, the current collector may be perforated and/or both the current collector and active material may be perforated. The battery may comprise a stack of anodes and cathodes. Each cathode of the stack may be perforated and/or each anode of the stack may be perforated. Each cathode of the stack may comprise two layers of active material on each side of the cathode where a first of the two layers of active material may be for prelithiation of anodes of the battery. A second of the two layers may be for lithium cycling of the battery.

11 Claims, 9 Drawing Sheets

(51) Int. Cl.
*H01M 4/38* (2006.01)
*H01M 4/74* (2006.01)
*H01M 10/0525* (2010.01)
*H01M 10/0585* (2010.01)

(52) U.S. Cl.
CPC ... *H01M 10/0525* (2013.01); *H01M 10/0585* (2013.01)

(56) References Cited

U.S. PATENT DOCUMENTS

| | | |
|---|---|---|
| 2015/0340732 A1 | 11/2015 | Kim |
| 2017/0104207 A1* | 4/2017 | Rubino ............... H01M 4/1397 |
| 2017/0309914 A1* | 10/2017 | Drews .................. H01M 4/483 |
| 2017/0309918 A1 | 10/2017 | Roumi et al. |
| 2019/0181440 A1 | 6/2019 | Park et al. |
| 2019/0181492 A1 | 6/2019 | Liu et al. |

OTHER PUBLICATIONS

Int'l Preliminary Report on Patentability Appln No. PCT/US2020/058057 mailed May 19, 2022.

* cited by examiner

USE OF PERFORATED ELECTRODES IN SILICON-DOMINANT ANODE CELLS

CROSS-REFERENCE TO RELATED APPLICATIONS/INCORPORATION BY REFERENCE

This application is a divisional application of U.S. patent application Ser. No. 16/676,813 filed on Nov. 7, 2019, which is hereby incorporated by reference herein in its entirety.

FIELD

Aspects of the present disclosure relate to energy generation and storage. More specifically, certain embodiments of the disclosure relate to a method and system for use of perforated anodes in silicon-dominant anode cells.

BACKGROUND

Conventional approaches for battery electrodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for use of perforated anodes in silicon-dominant anode cells, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
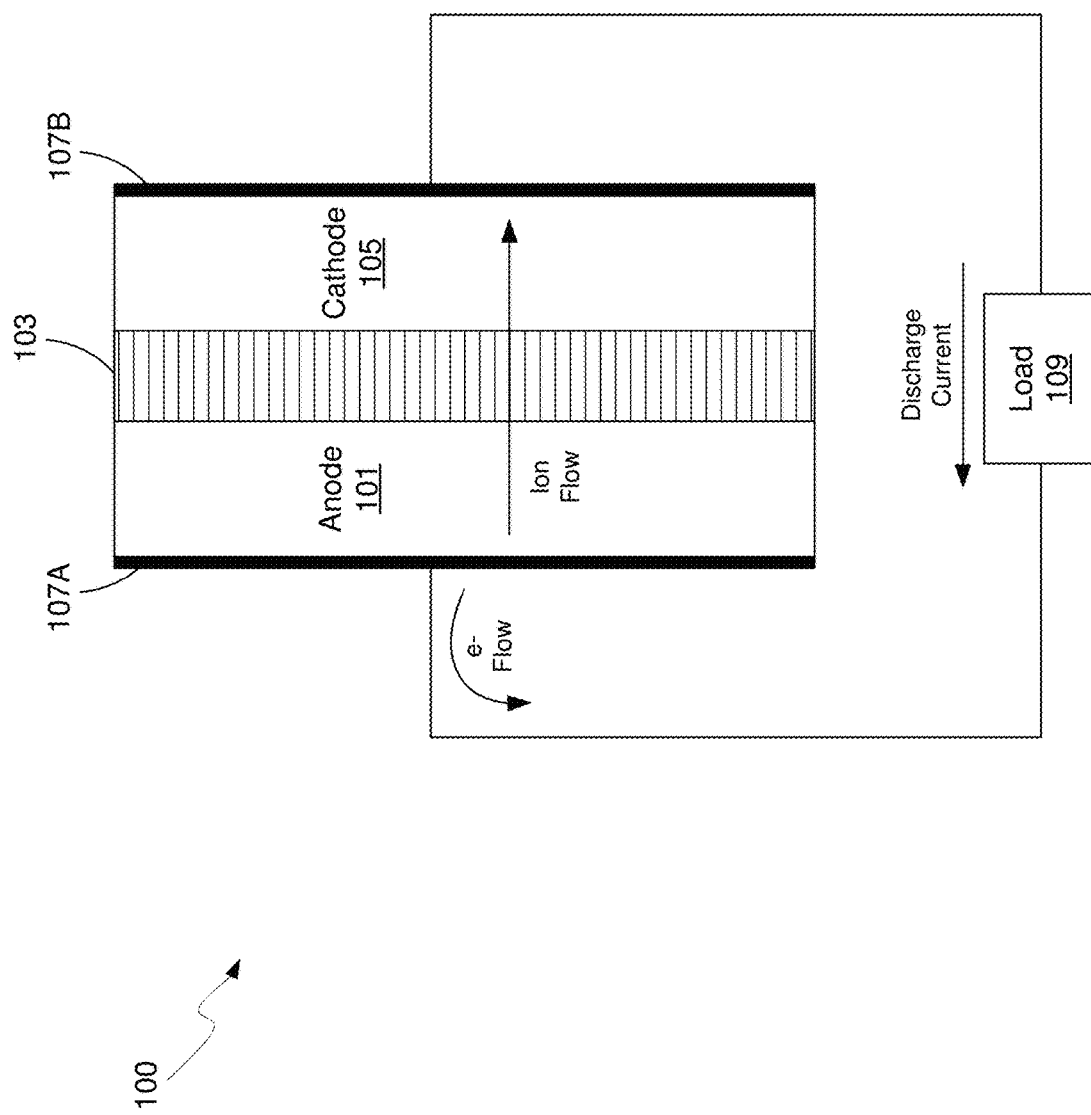
FIG. 1 is a diagram of a battery with perforated electrodes, in accordance with an example embodiment of the disclosure.

FIG. 1 is a diagram of a battery with perforated electrodes, in accordance with an example embodiment of the disclosure. Referring to FIG. 1, there is shown a battery 100 comprising a separator 103 sandwiched between an anode 101 and a cathode 105, with current collectors 107A and 107B. For clarity, the perforations are not shown in FIG. 1, but are shown in FIGS. 6-9. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. With demand for lithium-ion battery performance improvements such as higher energy density and fast-charging, silicon is being added as an active material or even completely replacing graphite as a dominant anode material. Most electrodes that are considered "silicon anodes" in the industry are graphite anodes with silicon added in small quantities (typically <20%). These graphite-silicon mixture anodes must utilize the graphite, which has a lower lithiation voltage compared to silicon; the silicon has to be nearly fully lithiated in order to utilize the graphite. Therefore, these electrodes do not have the advantage of a silicon or silicon composite anode where the voltage of the electrode is substantially above 0V vs Li/Li+ and thus are less susceptible to lithium plating. Furthermore, these electrodes can have significantly higher excess capacity on the silicon versus the opposite electrode to further increase the robustness to high rates.

Silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

The cathode in a lithium ion cell is typically the lithium source during operation, although some systems have anode-sourced lithium, and is also often used as the source during the first few charges of the cell, also called formation. In most cell applications or designs, a number of cathodes are sandwiched with a number of anodes, where in the simplest example there is one anode and one cathode. In some instances, the cathode may have active material on one side and in other instances the cathode has active material on both sides for better lithium supply when in stacked cells. In a stacked cell, where cathodes are the outer layer and are double-sided, the active material on the outer surface is effectively wasted, as lithium is not able to reach an anode. Alternatively, if single-sided cathodes are used for outer cathodes in a stacked cell, the manufacturing process is more complex and costly, as two types of cathode are used. This may be mitigated by utilizing perforated electrodes, where anodes and cathodes are formed on perforated current collectors, or alternatively perforations are formed in fabricated electrodes. This is shown further with respect to FIGS. 2-7.

Figure 2:
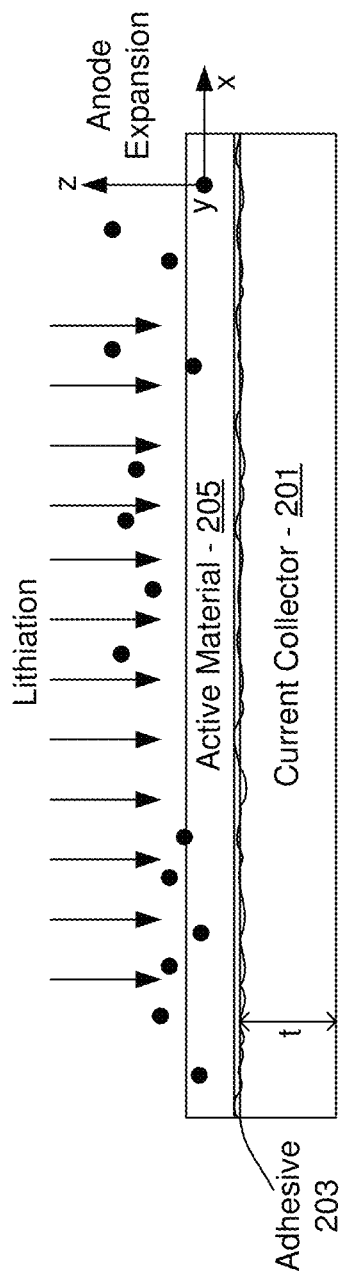
FIG. 2 illustrates an anode during lithiation, in accordance with an example embodiment of the disclosure.

FIG. 2 illustrates an anode during lithiation, in accordance with an example embodiment of the disclosure. Referring to FIG. 2, there are shown a current collector 201, adhesive 203, and an active material 205. It should be noted that the adhesive 203 may or may not be present depending on the type of anode fabrication process utilized, as the adhesive is not necessarily present in a direct coating process, and if present may be utilized before or after heat treatment. Furthermore, the layer thicknesses are not necessarily shown to scale, and the adhesive 203 is typically thin enough such that the active material 205 makes contact with the current collector 201 in various locations on the surface. In an example scenario, the anode active material 205 comprises silicon particles in a binder material and a solvent, where the active material is pyrolyzed to turn the binder into a glassy carbon that provides a structural framework around the silicon particles and also provides electrical conductivity. The active material may be coupled to the current collector 201 using the adhesive 203. The current collector 201 may comprise a metal film, such as copper, nickel, or titanium, for example, although other conductive foils may be utilized depending on desired tensile strength. The current collector 201 may comprise electrode perforations formed therein to allow lithiation to pass through from the side of the current collector 201 opposite to the active material 205.

FIG. 2 also illustrates lithium particles impinging upon and lithiating the active material 205 when incorporated into a cell with a cathode, electrolyte, and separator (not shown). The lithiation of silicon-dominant anodes causes expansion of the material, where horizontal expansion is represented by the x and y axes, and thickness expansion is represented by the z-axis, as shown. The current collector 201 has a thickness t, where a thicker foil provides greater strength and providing the adhesive 203 is strong enough, restricts expansion in the x- and y-directions, resulting in greater z-direction expansion, thus anisotropic expansion. Example thicker foils may be greater than 10 μm thick, such as 20 μm for copper, for example, while thinner foils may be less than 10 μm, such as ~5 μm thick or less for copper.

In an example scenario, in instances where adhesive is utilized, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing. If the adhesive 203 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion.

The current collector 201 may comprise electrode perforations formed therein to allow lithiation to pass through from the other side of the current collector 201, opposite to the active material 205. This is shown further with respect to FIGS. 3-8.

Figure 3:
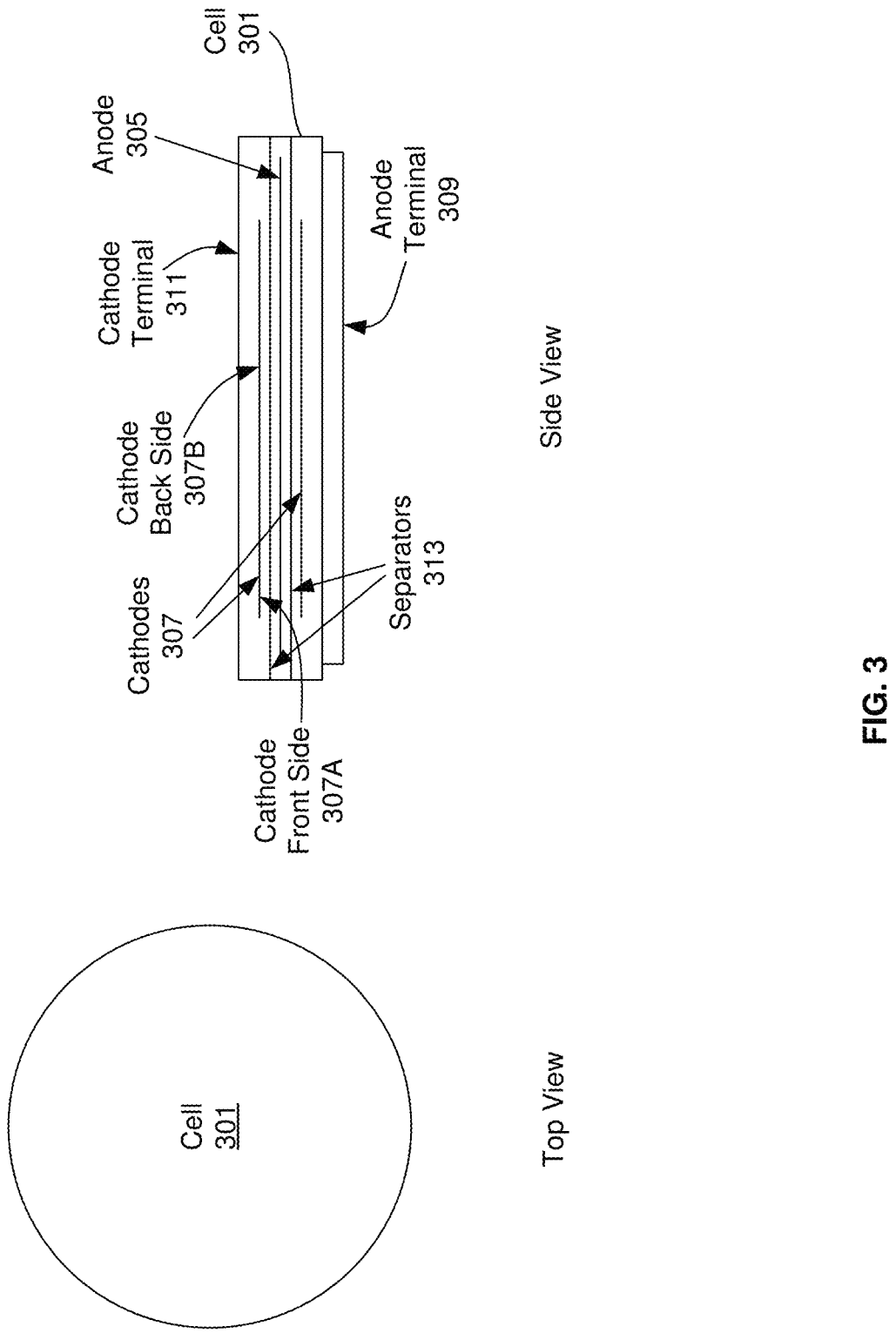
FIG. 3 shows top and side views of a cell, in accordance with an example embodiment of the disclosure.

FIG. 3 shows top and side views of a cell, in accordance with an example embodiment of the disclosure. Referring to FIG. 3, there is shown a cell 301 with anode 305 and cathodes 307. In this example, the cell 301 comprises a coin cell, although other types of cells are relevant, such as pouch, prismatic, and cylindrical, for example. The anode terminal 309 and the cathode terminal 311 provide electrical contact to outside loads coupled to the cell 301. In the example shown in FIG. 3, there are two cathodes 307 surrounding a single anode 305, although any number of anodes and cathodes is possible. The cell 300 also comprises separators 313 for isolating the anodes and cathodes while allowing lithium ions to pass through.

When stacking multiple anodes and cathodes, it is possible to form active material on both sides of current collectors, such that each cathode can lithiate two different anodes, one on each side. This may improve manufacturing and packaging efficiency to have active materials on both sides of a current collector. However, for cathodes on the top and bottom of the stack, such as the cathodes 307 in FIG. 3, the active material on the outside, such as the cathode back side 307B, it is nearly impossible to use that active material for the cell operation. For this reason, a single sided cathode may be used to eliminate wasted cathode active material, but then this means that for stacked cells with multiple cathodes and anodes, there may be two different types of cathodes utilized, increasing manufacturing cost and complexity.

In an example scenario, the cathodes 307 may comprise holes or perforations through their respective current collectors, or alternatively holes may be formed through both the current collectors as well as the active material. One example is to form active materials on perforated current collectors and another is to fabricate holes in completed anodes and/or cathodes. The cell fabrication process is described with respect to FIGS. 4 and 5.

Figure 4:
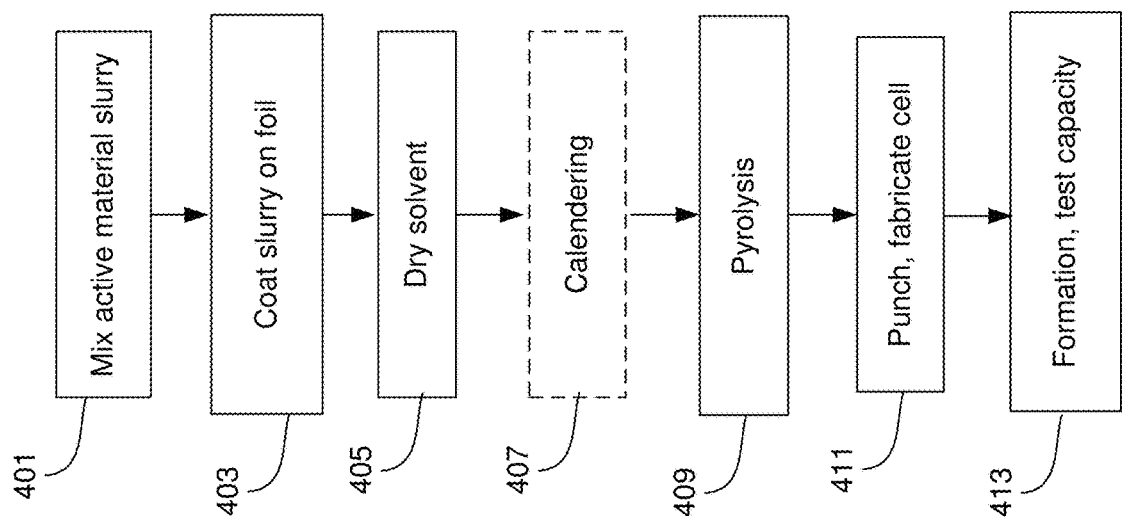
FIG. 4 is a flow diagram of a process for fabricating cells, in accordance with an example embodiment of the disclosure.

FIG. 4 is a flow diagram of a process for fabricating a cell, in accordance with an example embodiment of the disclosure. This process comprises physically mixing the active material, conductive additive, and binder together, and coating it directly on a current collector. This example process comprises a direct coating process in which an anode or cathode slurry is directly coated on a copper foil using a binder such as CMC, SBR, Sodium Alginate, PAI, PI and mixtures and combinations thereof. Another example process comprising forming the active material on a substrate and then transferring to the current collector is described with respect to FIG. 5.

In step 401, the raw electrode active material may be mixed using a binder/resin (such as PI, PAI), solvent, and conductive carbon. For example, for the anode, graphene/VGCF (1:1 by weight) may be dispersed in NMP under sonication for, e.g., 45-75 minutes followed by the addition of Super P (1:1:1 with VGCF and graphene) and additional sonication for, e.g., 45-75 minutes. Silicon powder with a desired particle size, may then be dispersed in polyamic acid resin (15% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness. Furthermore, cathode active materials may be mixed in step 401, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 403, the anode or slurry may be coated on a copper foil. Similarly, cathode active materials may be coated on a foil material, such as aluminum, for example. In one embodiment, the foil may comprise perforations through the material to allow flow-through of lithiation during operation of the cell.

The active material may undergo a drying in step 405 resulting in less than 15% residual solvent content. In step 407, an optional calendering process may be utilized where a series of hard pressure rollers may be used to finish the film/substrate into a smoothed and denser sheet of material.

In step 409, the anode active material may be pyrolyzed by heating to 500-800 C such that carbon precursors are partially or completely converted into glassy carbon. The pyrolysis step may result in an anode active material having silicon content greater than or equal to 50% by weight, where the anode has been subjected to heating at or above 400 degrees Celsius. Pyrolysis can be done either in roll form or after punching in step 411. If done in roll form, the punching is done after the pyrolysis process. In instances where the current collector foil is not pre-punched/pre-perforated, the formed electrode may be perforated with a punching roller, for example. The punched electrodes may then be sandwiched with a separator and electrolyte to form a cell. In step 413, the cell may be subjected to a formation process, comprising initial charge and discharge steps to lithiate the anode, with some residual lithium remaining, and the cell capacity may be assessed. The perforations in the electrodes allows lithium to flow from double-sided cathodes to anodes even if one side of the cathode does not face an anode, thereby increasing cell capacity.

Figure 5:
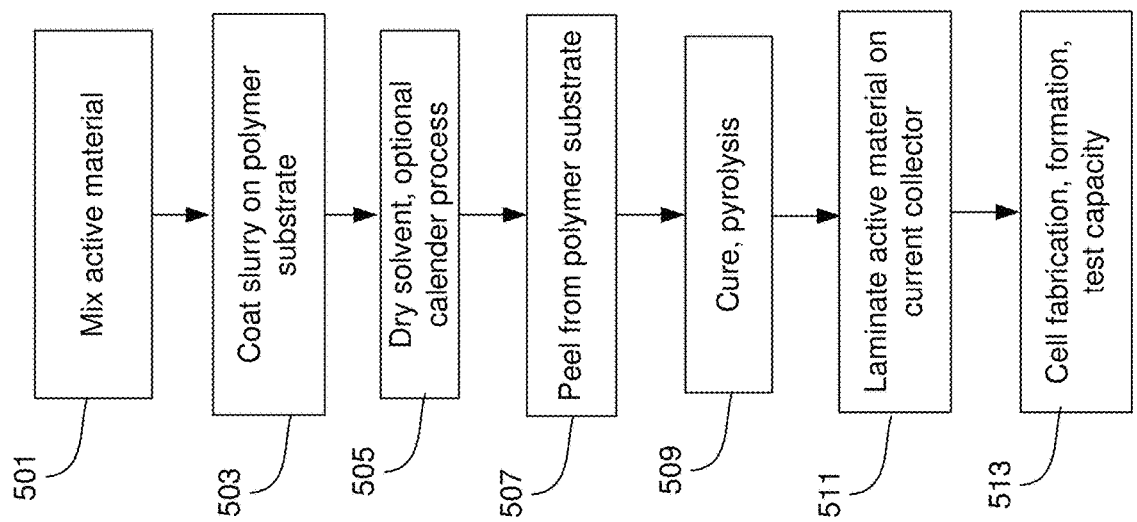
FIG. 5 is a flow diagram of an alternative process for fabricating cells, in accordance with an example embodiment of the disclosure.

FIG. 5 is a flow diagram of an alternative process for fabricating a cell, in accordance with an example embodiment of the disclosure. While the previous process to fabricate composite electrodes employs a direct coating process, this process physically mixes the active material, conductive additive, and binder together coupled with peeling and lamination processes.

This process is shown in the flow diagram of FIG. 5, starting with step 501 where the active material may be mixed with a binder/resin such as polyimide (PI) or polyamide-imide (PAI), solvent, the silosilazane additive, and optionally a conductive carbon. As with the process described in FIG. 4, graphene/VGCF (1:1 by weight) may be dispersed in NMP under sonication for, e.g., 45-75 minutes followed by the addition of Super P (1:1:1 with VGCF and graphene) and additional sonication for, e.g., 45-75 minutes. Silicon powder with a desired particle size, may then be dispersed in polyamic acid resin (15% solids in N-Methyl pyrrolidone (NMP)) at, e.g., 1800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness.

Furthermore, cathode active materials may be mixed in step 501, where the active material may comprise lithium cobalt oxide (LCO), lithium iron phosphate, lithium nickel cobalt manganese oxide (NMC), lithium nickel cobalt aluminum oxide (NCA), lithium manganese oxide (LMO), lithium nickel manganese spinel, or similar materials or combinations thereof, mixed with a binder as described above for the anode active material.

In step 503, the slurry may be coated on a polymer substrate, such as polyethylene terephthalate (PET), polypropylene (PP), or Mylar. The slurry may be coated on the PET/PP/Mylar film at a loading of 3-4 mg/cm$^2$ (with 15% solvent content), and then dried to remove a portion of the solvent in step 505. An optional calendering process may be utilized where a series of hard pressure rollers may be used to finish the film/substrate into a smoothed and denser sheet of material.

In step 507, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 509 where the film may be cut into sheets, and vacuum dried using a two-stage process (100-140° C. for 12-18 hours, 200-240° C. for 4-6 hours). The dry film may be thermally treated at 800-1200° C. to convert the polymer matrix into carbon. The pyrolysis step may result in an anode active material having silicon content greater than or equal to 50% by weight, where the anode has been subjected to heating at or above 400 degrees Celsius.

In step 511, the pyrolyzed material may be flat press or roll press laminated on the current collector, where for an anode, a copper foil may be coated with polyamide-imide with a nominal loading of 0.4-0.6 mg/cm$^2$ (applied as a 6 wt % varnish in NMP, dried 14-18 hours at 100-140° C. under vacuum) while for a cathode, the active material may be laminated to an aluminum foil, for example. The foil may comprise perforations. The silicon-carbon composite film may be laminated to the coated foil using a heated hydraulic press (40-60 seconds, 250-450° C., and 3000-5000 psi), thereby forming the finished silicon-composite electrode. In another embodiment, the pyrolyzed material may be roll-press laminated to the current collector. In instances where the current collector does not have perforations before laminating with the active material, the completed electrodes may be perforated, using a punching process, for example.

In step 513, the electrodes may then be sandwiched with a separator and electrolyte to form a cell. The cell may be subjected to a formation process, comprising initial charge and discharge steps to lithiate the anode, with some residual lithium remaining, and the cell capacity may be assessed. The perforations in the electrodes allows lithium to flow from double-sided cathodes to anodes even if one side of the cathode does not face an anode, thereby increasing cell capacity.

Figure 6:
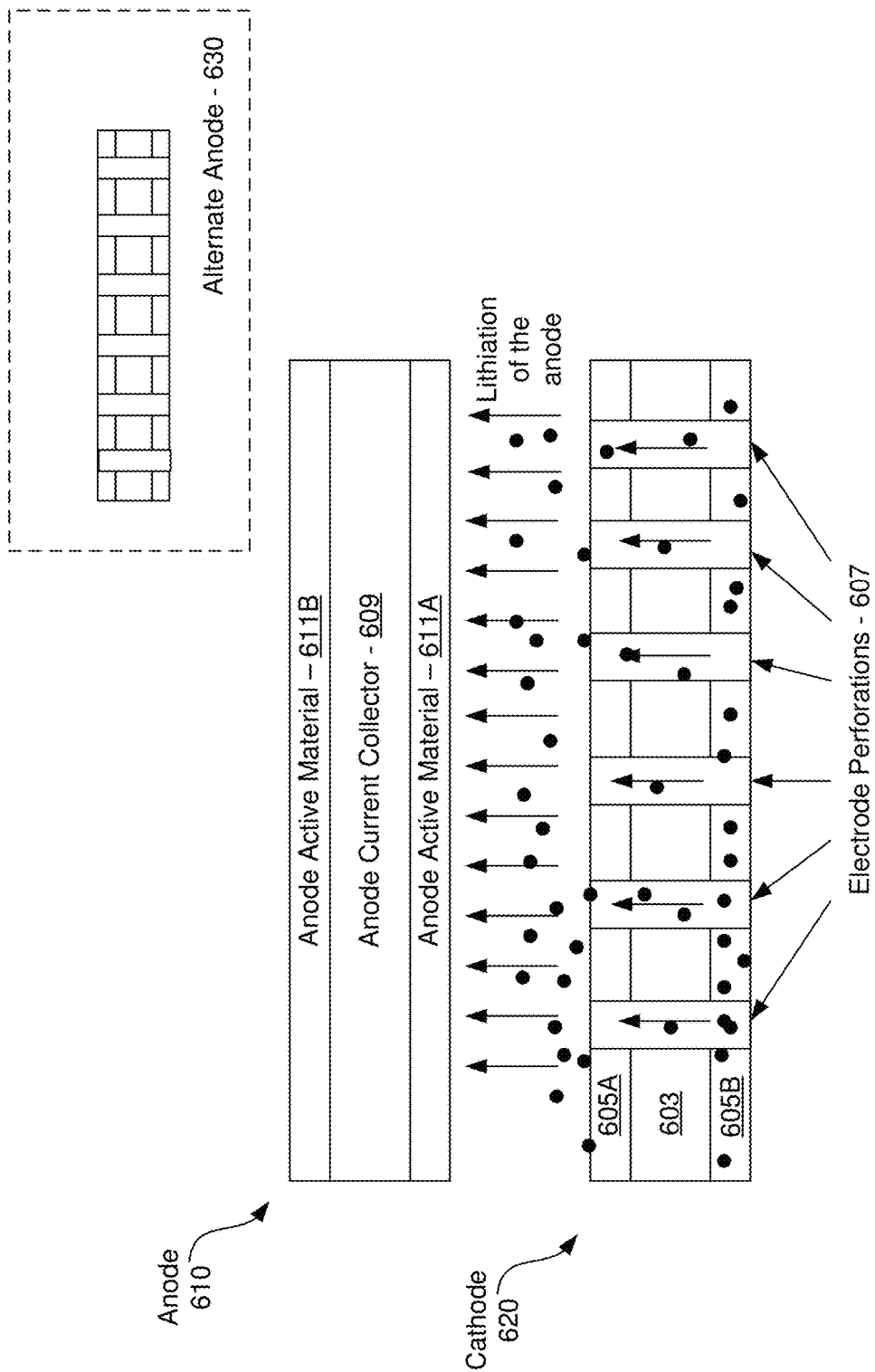
FIG. 6 illustrates a perforated cathode during anode lithiation, in accordance with an example embodiment of the disclosure.
Figure 7:
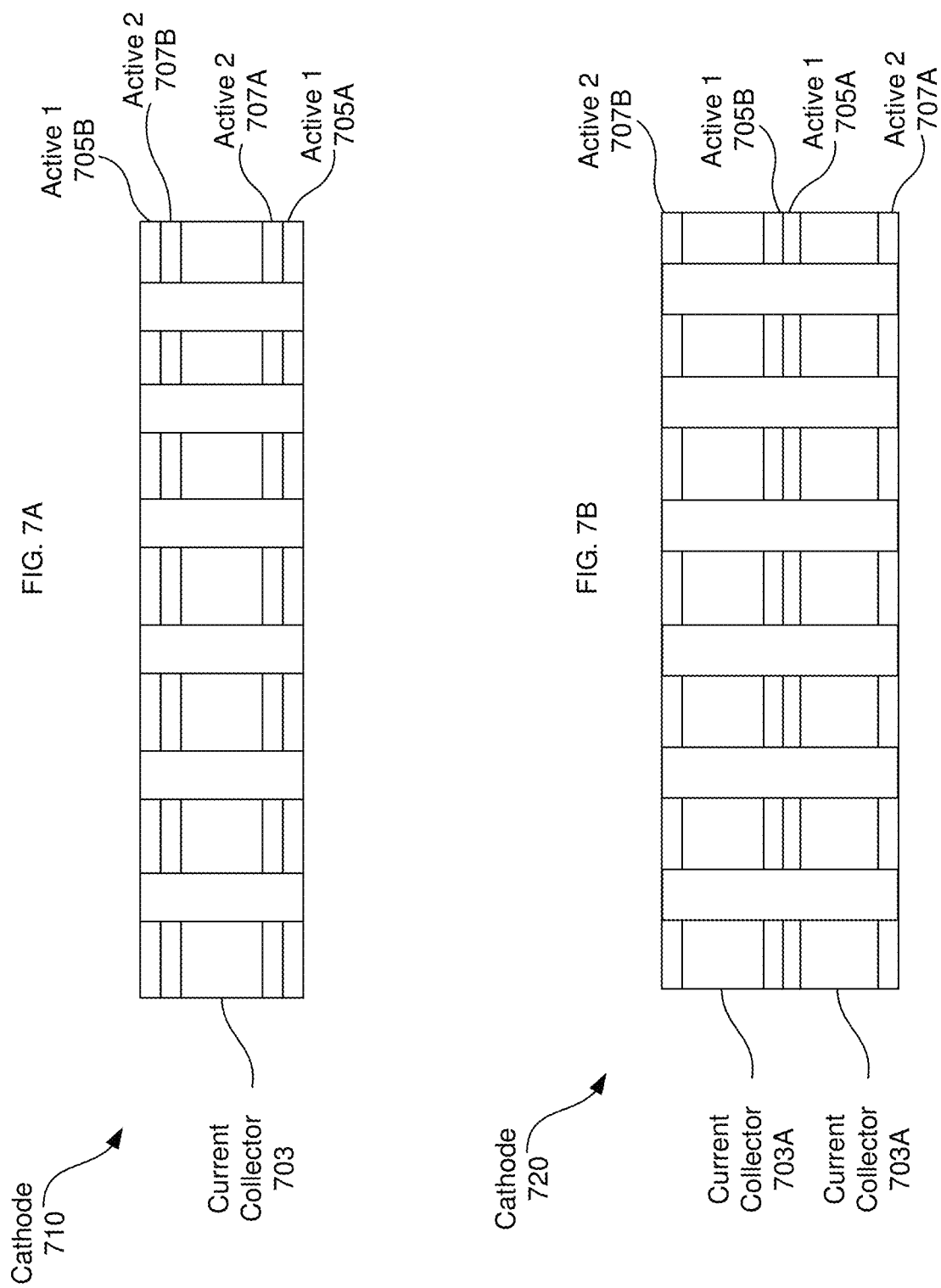
FIGS. 7A and 7B illustrate two embodiments of a multi-layer cathode, in accordance with an example embodiment of the disclosure.

FIG. 6 illustrates a perforated cathode during anode lithiation, in accordance with an example embodiment of the disclosure. Referring to FIG. 6, there are shown an anode 610 and a cathode 620. The anode 610 comprises a current collector 609, and active materials 611A and 611B, where an adhesive is not shown but may be present between active materials 611A and 611B and the current collector 609 depending on the fabrication process used. The cathode 620 comprises a current collector 603 and active materials 605A and 605B. As with previous figures, the layer thicknesses are not necessarily to scale.

In the example shown, the cathode 620 has perforations through the entire electrode, although in another embodiment the perforations may just be in the current collector 603. Also, the anode 610 is illustrated without perforations as it may be sandwiched by cathodes on both sides (not shown), but alternatively, the anode may also be perforated, as shown in the inset with alternate anode 630 showing perforations similar to the cathode 620.

In an example scenario, where the cathode 620 is a top or bottom electrode of a cell stack, meaning no further electrodes are situated beyond it, the perforations 607 may enable lithium from the active material 605B to travel to the anode 610, increasing the capacity of the cell, because without the perforations, any active material on the back side, active material 605B, would not be utilized for battery operation. While the electrode perforations 607 are shown as holes through the structure, other structures are possible such as a mesh foil or expanded foil with a chain link fence-like pattern. In an example embodiment, the perforation area for the anode and cathode may range from 0.1% to 40% of the electrode area.

The active material 605B may be a lithiation source for prelithiation of the cell. Various factors may enable the lithium from this layer to travel throughout the cell. One is formation charge rate, where a slower charge rate under 1 C can improve this prelithiation. In addition, higher temperatures during formation, e.g. greater than 50° C., may improve diffusion of the lithium, and a higher number of cycles with low charge rates and higher temperatures may be utilized.

FIGS. 7A and 7B illustrate two examples of a multi-layer cathode, in accordance with an example embodiment of the disclosure. Referring to FIG. 7A, there is shown electrode 710 comprising current collector 703 and a pair of active layers on each side, active 1 705A, active 2 707A on one side, and active 1 705B and active 2 707B on the other. In an example embodiment, one active layer on each side may comprise a prelithiation source, while the other active layer on each side comprises the lithium that is cycled during normal operation of the cell. The loading, or amount of material per area, may be configured in each layer for different functions, such as prelithiation or cycling.

Referring to FIG. 7B, there is shown there is shown electrode 720 comprising two current collectors 703A and 703B and an active layer on each side, each with an active layer 1 705A or 705B on one side and active 2 707A or 707B on the other side. In an example embodiment, one active layer on each side may comprise a prelithiation source, while the other active layer on each side comprises the lithium that is cycled during normal operation of the cell. The loading, or amount of material per area, may be configured in each layer for different functions, such as prelithiation or cycling.

Stacking of such multi-layer electrodes along with controlled formation may enable precise configuration of the available lithium throughout a cell. This can greatly improve cell capacity and energy density. As stated for FIG. 6, in an example embodiment, the perforation area for the electrode may range from 0.1% to 40% of the electrode area.

Figure 8:
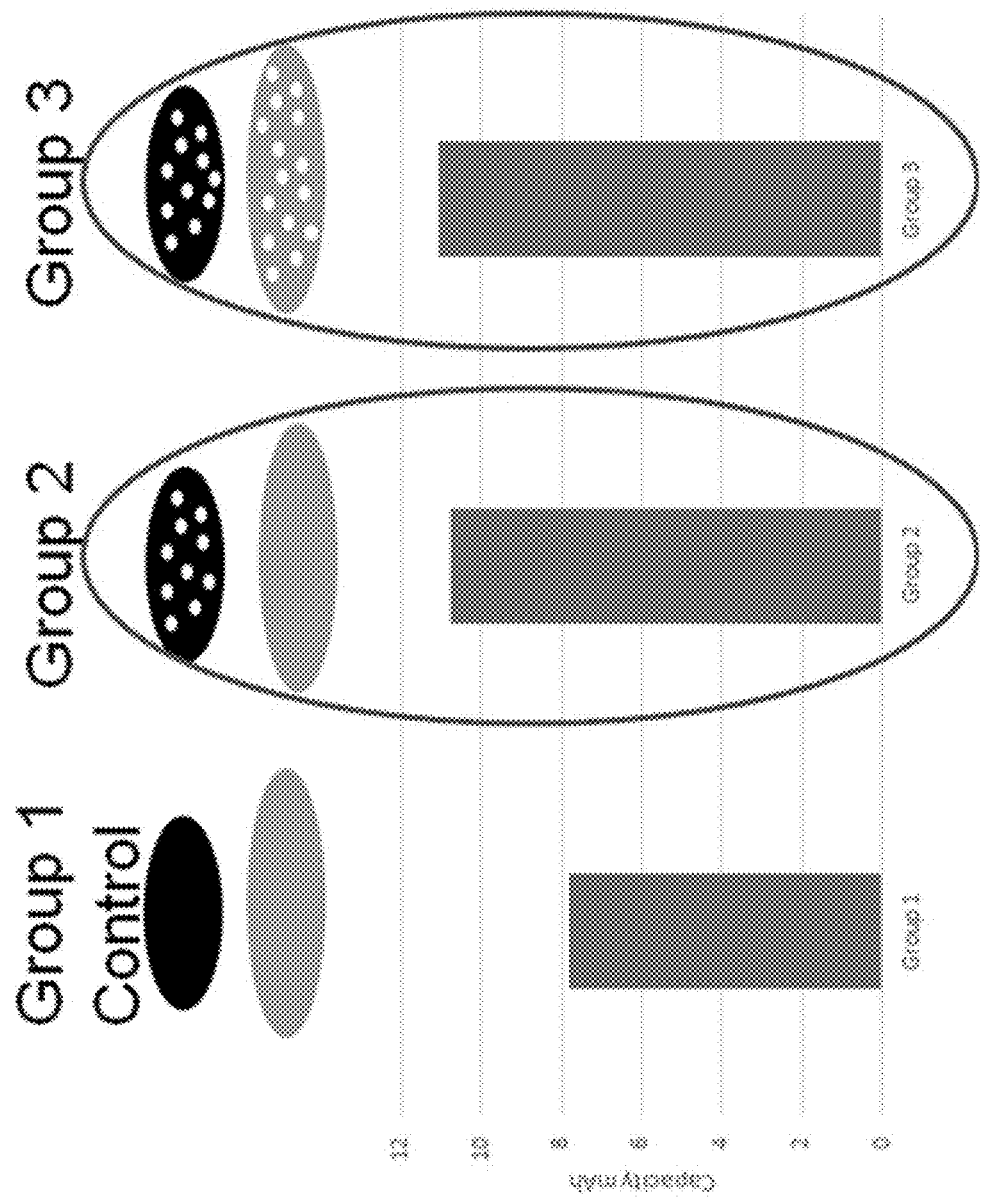
FIG. 8 illustrates cell capacity for standard and perforated electrodes, in accordance with an example embodiment of the disclosure.

FIG. 8 illustrates cell capacity for standard and perforated electrodes, in accordance with an example embodiment of the disclosure. Referring to FIG. 8, there is shown a plot of cell capacity for a two-layer coin cell without perforations as the control, Group 1, a perforated cathode and non-perforated anode for Group 2, and perforated anode and perforated cathode for Group 3. As can be seen in the plot, the capacity increases significantly with a perforated cathode cell of Group 2 as compared to the non-perforated electrodes of Group 1, increasing from ~8 mAh to ~11 mAh. There is a smaller increase for Group 3 with both electrodes being perforated, which may be due to the over-capacity of the anodes, where the cathode limits the cell capacity, so improving the anode does not change the capacity significantly. Nevertheless, anode perforations can further increase the energy density of the cell with more efficient use of active materials.

Figure 9:
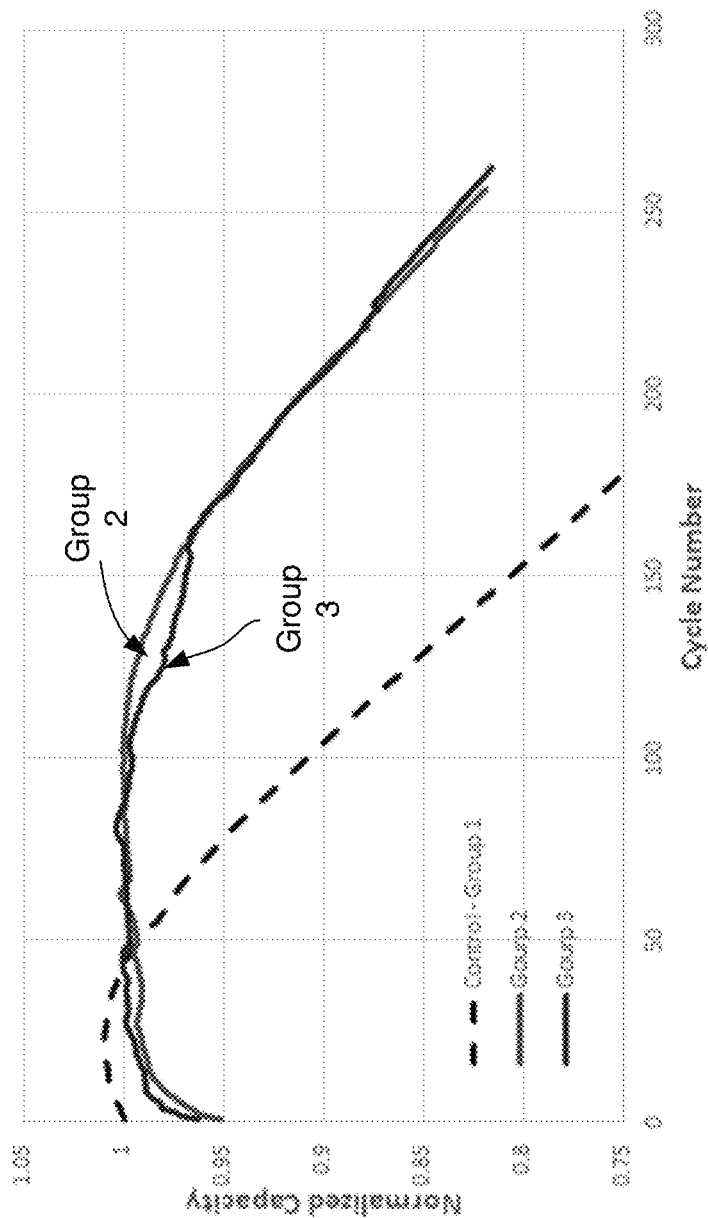
FIG. 9 illustrates cycle life for standard and perforated electrodes, in accordance with an example embodiment of the disclosure.

FIG. 9 illustrates cycle life for standard and perforated electrodes, in accordance with an example embodiment of the disclosure. Referring to FIG. 9, there is shown a plot of normalized capacity of control Group 1, non-perforated electrodes, Group 2 with perforated cathode, and Group 3 with perforated anode and cathode.

The perforated electrode cells of Group 2 and 3 are very similar to each other but both much better than the control Group 1, with significantly better cycle life. The cells were cycled with 1 C charge to 4.2 V and 1 C discharge to 2.5 V. The perforated electrode cells retained more than 80% of capacity out to 250 cycles while the non-perforated electrode control group fell to 75% capacity in ~175 cycles.

In an example embodiment of the disclosure, a method and system are described for use of perforated anodes in silicon-dominant anode cells. The battery may comprise a cathode, an electrolyte, and an anode, where the cathode and anode each comprise an active material on a current collector. One or both of the current collector and active material may be perforated. For example, the current collector may be perforated and/or both the current collector and active material may be perforated. The battery may comprise a stack of anodes and cathodes. Each cathode of the stack may be perforated and/or each anode of the stack may be perforated. Each cathode of the stack may comprise two layers of active material on each side of the cathode where a first of the two layers of active material may be for prelithiation of anodes of the battery. A second of the two layers may be for lithium cycling of the battery. A formation process of the battery may be performed with a less than 1 C charge rate. The active material of the anode may comprise 50% or greater silicon by weight.

Outer surfaces of outermost cathodes of the stack may comprise active material for prelithiation of silicon-dominant anodes in the battery. Each cathode of the stack may comprise a first type of active material on a first surface of the cathode and a second type of active material on a second surface of the cathode, where the first type of active material is for prelithiating silicon-dominant anodes of the battery and the second type of active material is for lithium cycling of the battery. Each cathode of the stack may comprise two current collectors, each with a first type of active material on a first surface of the current collector and a second type of active material on a second surface of the current collector, where the first type of active material is for prelithiating silicon-dominant anodes of the battery and the second type of active material is for lithium cycling of the battery.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery, the battery comprising:
a cathode, an electrolyte, and an anode, the cathode and anode each comprising an active material on a current collector, wherein the current collector is perforated and one or both of the active material of the anode and the active material of the cathode is or are perforated, and
wherein the cathode comprises two adjacent layers of active material on each side of the cathode current collector,
wherein a first of the two layers of active material on each side of the cathode current collector is loaded with a first amount of material per area for prelithiation of silicon-dominant anodes of the battery, and a second of the two layers on each side of the cathode is loaded with a second amount of material per area different from the first amount of material per area for lithium cycling of silicon-dominant anodes of the battery,
wherein the first of the two layers of active material of each cathode of the stack is a first type of active material on a first surface of the cathode, and the second of the two layers of active material is a second type of active material on a second surface of the cathode,
the first and second type of active material including one or more of lithium cobalt oxide (LCO), lithium iron phosphate, lithium nickel cobalt manganese oxide (NMC), lithium nickel cobalt aluminum oxide (NCA), lithium manganese oxide (LMO), or lithium nickel manganese spinel, and
wherein perforations of the cathode allow travel of lithium from the first of the two layers of active material through the cathode to the anode during prelithiation.

2. The battery according to claim 1, wherein the battery comprises a stack of anodes and cathodes.

3. The battery according to claim 2, wherein each cathode of the stack is perforated.

4. The battery according to claim 2, wherein the first of the two layers of active material is on outer surfaces of outermost cathodes of the stack for prelithiation of silicon-dominant anodes in the battery.

5. The battery according to claim 1, wherein the first type of active material is for prelithiation of silicon-dominant anodes of the battery and the second type of active material is for lithium cycling of the battery.

6. The battery according to claim 1, wherein the active material of the anode comprises 50% or greater silicon by weight.

7. The battery according to claim 1, wherein a formation process of the battery is performed with a less than 1C charge rate.

8. A battery, the battery comprising:
a plurality of cathodes, an electrolyte, and a plurality of anodes, the cathodes and anodes each comprising active materials on a respective current collector, wherein both the active materials and the current collector of each of the cathodes is perforated over less than 40% of an area of the cathodes, and wherein the anodes are at least 50% silicon content by weight,
wherein each cathode has a first active material layer of a first type of active material and a second active material layer comprises a second type of active material different from the first type of active material,
wherein the first and second types of active material includes one or more of lithium cobalt oxide (LCO), lithium iron phosphate, lithium nickel cobalt manganese oxide (NMC), lithium nickel cobalt aluminum oxide (NCA), lithium manganese oxide (LMO), or lithium nickel manganese spinel.

9. The battery according to claim 8, wherein the first type of active material is for prelithiation of silicon-dominant anodes of the battery and the second type of active material is for lithium cycling of the battery.

10. The battery according to claim 8, wherein the first active material layer is loaded with a first amount of the first active material per area for prelithiation of silicon-dominant anodes of the battery, and the second active material layer is loaded with a second amount of the second active material per area, the second amount of the second active material being different from the first amount of the first active material per area for lithium cycling of silicon-dominant anodes of the battery.

11. The battery according to claim 9, wherein perforations of the cathode allow travel of lithium from the first type of active material through the cathode to the anode during prelithiation.

* * * * *